(12) United States Patent
Porter et al.

(10) Patent No.: US 12,517,381 B2
(45) Date of Patent: Jan. 6, 2026

(54) SMART GLASSES WITH ACOUSTIC CHANNEL

(71) Applicant: Vuzix Corporation, West Henrietta, NY (US)

(72) Inventors: Tyler Porter, Honeoye Falls, NY (US); Cody O'Connor, Fairport, NY (US)

(73) Assignee: Vuzix Corporation, West Henrietta, NY (US)

( * ) Notice: Subject to any disclaimer, the term of this patent is extended or adjusted under 35 U.S.C. 154(b) by 225 days.

(21) Appl. No.: 18/023,873

(22) PCT Filed: Sep. 1, 2021

(86) PCT No.: PCT/US2021/048752
§ 371 (c)(1),
(2) Date: Feb. 28, 2023

(87) PCT Pub. No.: WO2022/051426
PCT Pub. Date: Mar. 10, 2022

(65) Prior Publication Data
US 2024/0027795 A1    Jan. 25, 2024

Related U.S. Application Data

(60) Provisional application No. 63/073,354, filed on Sep. 1, 2020.

(51) Int. Cl.
*G02C 11/06* (2006.01)
*G02B 27/01* (2006.01)
(Continued)

(52) U.S. Cl.
CPC .......... *G02C 11/06* (2013.01); *G02B 27/0172* (2013.01); *G02C 11/10* (2013.01);
(Continued)

(58) Field of Classification Search
CPC .. H04R 1/2842; H04R 1/345; H04R 2499/15; H04R 5/0335; G02C 11/06; G02C 11/10; G02B 2027/017
See application file for complete search history.

(56) References Cited

U.S. PATENT DOCUMENTS 3,809,829 A    5/1974    Vignini et al.
5,159,639 A *  10/1992   Shannon ................ G02C 11/06
                                                         381/323

(Continued)

FOREIGN PATENT DOCUMENTS

CN        104853278 A    8/2015

OTHER PUBLICATIONS

United States Patent & Trademark Office (ISA/US), International Search Report and Written Opinion in PCT/US2021/048752, dated Nov. 30, 2021, 8 pages.

*Primary Examiner* — Huyen D Le
(74) *Attorney, Agent, or Firm* — Harter Secrest & Emery LLP; Jacob D. Merrill, Esq.

(57) ABSTRACT

A smart glasses device including a temple arm having a proximal end and a distal end. The smart glasses device having an optical system coupled with the temple arm proximal end, and a speaker located at least partially in the temple arm distal end. The smart glasses also having a compartment located at least partially about the speaker, wherein the compartment forms a back volume. A passageway located at least partially within the temple arm, wherein the passageway is in acoustic communication with the compartment, and one or more audio ports located in the temple arm, wherein the one or more audio ports are in acoustic communication with the passageway.

15 Claims, 10 Drawing Sheets

(51) Int. Cl.
*G02C 11/00* (2006.01)
*H04R 1/28* (2006.01)
*H04R 1/34* (2006.01)
*H04R 5/033* (2006.01)

(52) U.S. Cl.
CPC ........... *H04R 1/2842* (2013.01); *H04R 1/345* (2013.01); *H04R 5/0335* (2013.01); *G02B 2027/0178* (2013.01); *H04R 2499/15* (2013.01)

(56) References Cited

U.S. PATENT DOCUMENTS

| | | |
|---|---|---|
| 11,598,979 B1 * | 3/2023 | Johnson ................. H04R 1/345 |
| 2008/0013041 A1 * | 1/2008 | Chou ..................... G02C 11/06 |
| | | 351/158 |
| 2011/0064255 A1 | 3/2011 | Lewis |
| 2018/0047395 A1 | 2/2018 | Sommers et al. |
| 2018/0095299 A1 | 4/2018 | Cazalet et al. |
| 2019/0179409 A1 | 6/2019 | Jones et al. |
| 2019/0187465 A1 | 6/2019 | Erler et al. |
| 2020/0041821 A1 | 2/2020 | Graff et al. |

\* cited by examiner

FIG. 9

SMART GLASSES WITH ACOUSTIC CHANNEL

This patent application is a national phase application under 35 International U.S.C. § 371 of Patent Application No. PCT/US2021/048752, filed Sep. 1, 2021, entitled "SMART GLASSES WITH ACOUSTIC CHANNEL", which claims the priority benefit of U.S. Provisional Patent Application No. 63/073,354, filed Sep. 1, 2020, entitled "SMART GLASSES WITH ACOUSTIC CHANNEL", each of which is incorporated herein by reference in its entirety for all purposes.

TECHNICAL FIELD

The present disclosure relates generally to smart glasses, and more specifically to audio output in a smart glasses device.

BACKGROUND

With rapid advances in technology, manufacturers of mobile devices (e.g., head mounted displays, smart glasses, etc.) are continually challenged to add greater functional capability in smaller form to achieve convenience of mobility. For instance, beyond the already advanced capabilities of mobile devices, there is a need for a smart glasses device having integrated audio functions to accompany a virtual display.

Head-Mounted Displays (HMD's) are being developed for a range of diverse uses, including military, commercial, industrial, fire-fighting, and entertainment applications. For many of these applications, there is particular value in providing audio capability.

SUMMARY

The present disclosure provides for a smart glasses device having an integrated speaker and audio ports located remote from the audio driver.

In a first exemplary embodiment, the present disclosure provides for a smart glasses device including a temple arm having a proximal end and a distal end. The smart glasses device having an optical system coupled with the temple arm proximal end, and a speaker located at least partially in the temple arm distal end. The smart glasses also having a compartment located at least partially about the speaker, wherein the compartment forms a back volume. A passageway located at least partially within the temple arm, wherein the passageway is in acoustic communication with the compartment, and one or more audio ports located in the temple arm, wherein the one or more audio ports are in acoustic communication with the passageway.

BRIEF DESCRIPTION OF THE DRAWINGS

The accompanying drawings are incorporated herein as part of the specification. The drawings described herein illustrate embodiments of the presently disclosed subject matter and are illustrative of selected principles and teachings of the present disclosure. However, the drawings do not illustrate all possible implementations of the presently disclosed subject matter and are not intended to limit the scope of the present disclosure in any way.

DETAILED DESCRIPTION

It is to be understood that the invention may assume various alternative orientations and step sequences, except where expressly specified to the contrary. It is also to be understood that the specific assemblies and systems illustrated in the attached drawings and described in the following specification are simply exemplary embodiments of the inventive concepts defined herein. Hence, specific dimensions, directions, or other physical characteristics relating to the embodiments disclosed are not to be considered as limiting, unless expressly stated otherwise. Also, although they may not be, like elements in various embodiments described herein may be commonly referred to with like reference numerals within this section of the application.

Where they are used herein, the terms "first", "second", and so on, do not necessarily denote any ordinal, sequential, or priority relation, but are simply used to more clearly distinguish one element or set of elements from another, unless specified otherwise.

Where they are used herein, the terms "viewer", "operator", "observer", and "user" are considered to be equivalent and refer to the person or machine that wears and/or views images using an electronic device.

Where used herein, the term "set" refers to a non-empty set, as the concept of a collection of elements or members of a set is widely understood in elementary mathematics. Where used herein, the term "subset", unless otherwise explicitly stated, refers to a non-empty proper subset, that is, to a subset of the larger set, having one or more members. For a set S, a subset may comprise the complete set S. A "proper subset" of set S, however, is strictly contained in set S and excludes at least one member of set S.

Head-Mounted Displays (HMD's) are developed for a range of diverse uses, including military, commercial, industrial, fire-fighting, and entertainment applications. An HMD is operable to form a virtual color image that can be visually superimposed over the real-world image that lies in the field of view of the HMD user. Optically transparent flat parallel plate waveguides, also called planar waveguides, convey image-bearing light generated by a polychromatic, or monochromatic, projector system to the HMD user. The planar waveguides convey the image-bearing light in a narrow space to direct the image to the HMD user's pupil and enable the superposition of the virtual image over the real-world image that lies in the field of view of the HMD user.

In imaging light guides, collimated, relatively angularly encoded light beams from a color image projector source are coupled into an optically transparent planar waveguide assembly by an input coupling optic, such as an in-coupling diffractive optic, which can be mounted or formed on a surface of the parallel plate planar waveguide or disposed within the waveguide. Such diffractive optics can be formed as, but are not limited to, diffraction gratings or holographic optical elements. For example, the diffraction grating can be formed as a surface relief grating. After propagating along the planar waveguide, the diffracted color image-bearing light can be directed back out of the planar waveguide by a similar output grating, which may be arranged to provide pupil expansion along one or more directions. In addition, one or more intermediate diffractive optics (e.g., turning gratings) may be positioned along the waveguide optically between the input and output gratings to provide pupil expansion in one or more directions. The image-bearing light output from the parallel plate planar waveguide provides a virtual image within an expanded eyebox for the viewer.

In contrast to methods for forming a real image, a virtual image is not formed on a display surface. That is, if a display surface were positioned at the perceived location of a virtual image, no image would be formed on that surface. Virtual image display has a number of inherent advantages for augmented reality presentation. For example, the apparent size of a virtual image is not limited by the size or location of a display surface. Additionally, the source object for a virtual image may be small; for example, a magnifying glass provides a virtual image of an object. In comparison with systems that project a real image, a more realistic viewing experience can be provided by forming a virtual image that appears to be some distance away. Providing a virtual image also obviates the need to compensate for screen artifacts, as may be necessary when projecting a real image. The augmented reality (AR) smart glasses device(s) described herein provide integrated audio functionality to accompany the virtual image functionality thereof.

Figure 1:
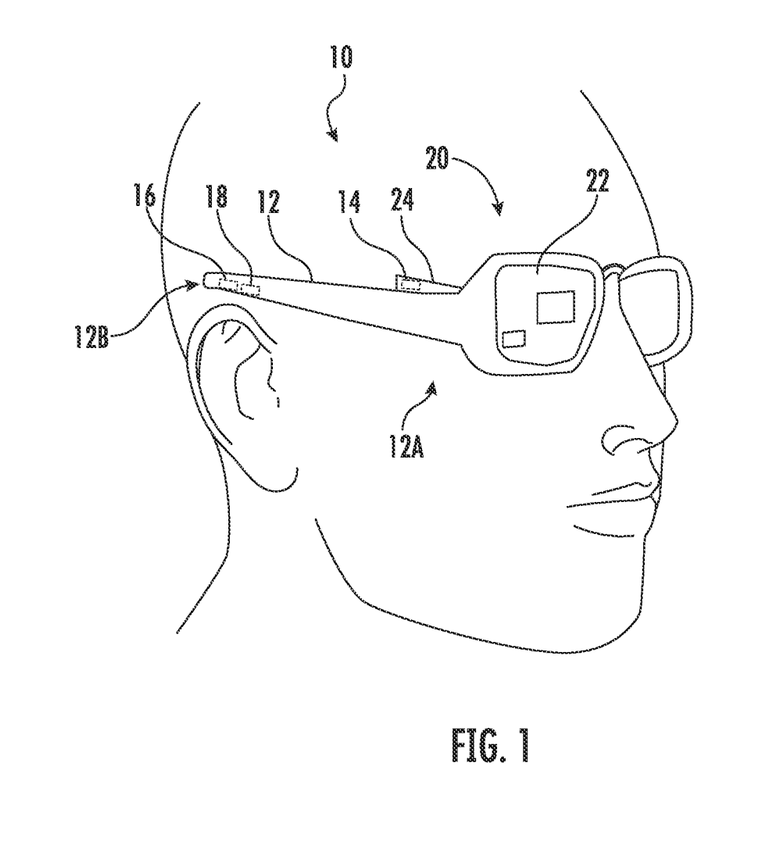
FIG. 1 shows smart glasses device according to an embodiment of the present disclosure.

As illustrated in FIG. 1, in an embodiment, a display system operable for augmented reality viewing comprises smart glasses 10. The smart glasses 10 include at least a right temple arm 12 and a processing unit 14 having memory operable to store data and computer programs. The processing unit 14 is also operable to execute the computer programs. The smart glasses 10 may include a right eye optical system 20 having an image light guide 22. The smart glasses 10 include an image source 24 such as, but not limited to, a picoprojector, microLED projector, or similar device, energizable to generate an image. The virtual image that is formed by the smart glasses 10 can appear to be superimposed or overlaid onto the real-world scene content as seen by the viewer through the image light guide 22. Additional components familiar to those skilled in the augmented reality visualization arts, such as one or more cameras mounted on the frame of the HMD for viewing scene content and/or viewer gaze tracking, can also be provided.

As illustrated in FIGS. 1-3B, in an embodiment, the right temple arm 12 includes a proximal end 12A located adjacent to the right eye optical system 20, and a distal end 12B located opposite the proximal end 12A. A power source 16, such as a battery, and the speaker 18 are located in the temple arm distal end 12B. The processing unit 14 is in electrical communication with the power source 16 and the speaker 18. For example, the speaker 18 may be an electroacoustic transducer having an audio driver.

Figure 3A:
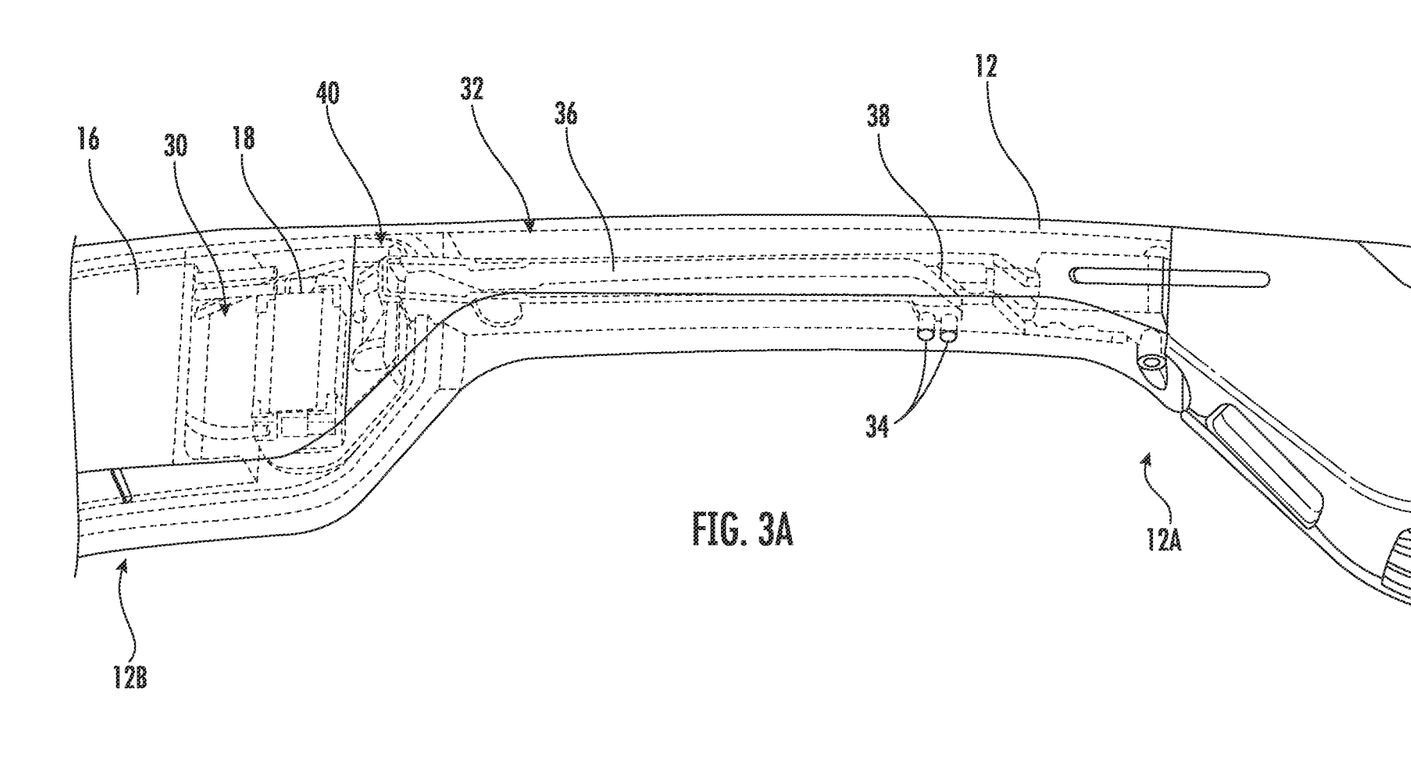
FIG. 3A shows a right side perspective view of a portion of the smart glasses device according to FIG. 2.
Figure 3B:
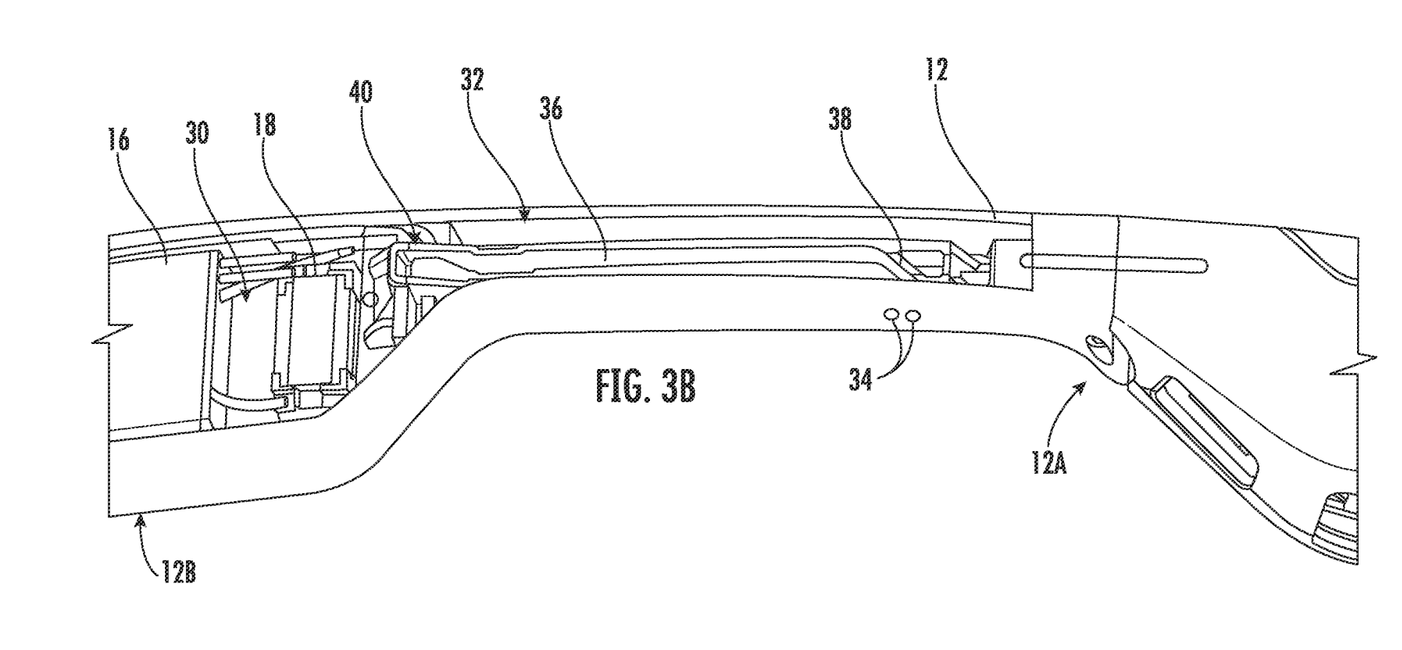
FIG. 3B shows a right side perspective cutaway view of a portion of the smart glasses device according to FIG. 2.
Figure 4:
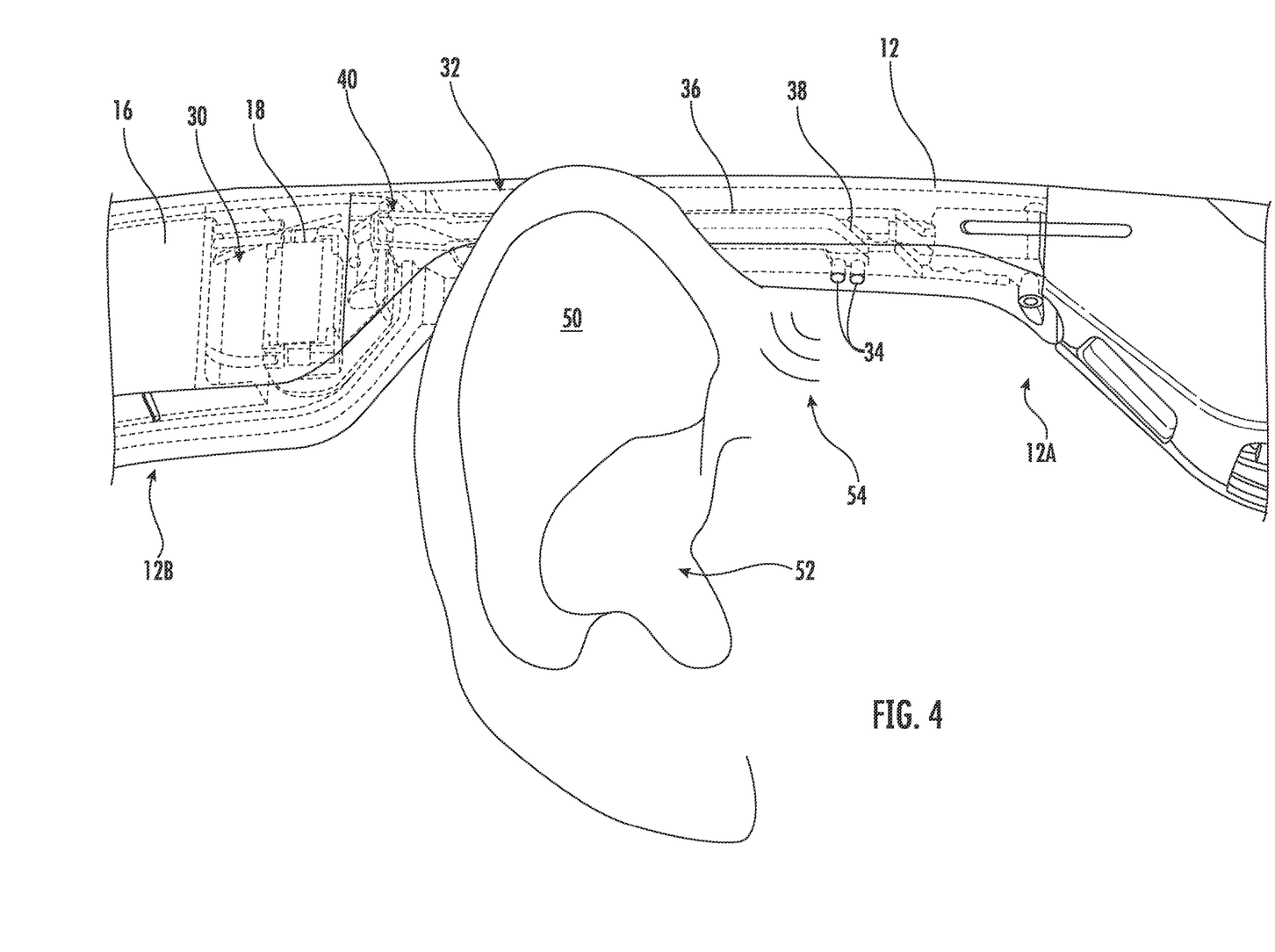
FIG. 4 shows a right side perspective view of a portion of the smart glasses device according to FIG. 2 and a wearer's ear.

Referring now to FIGS. 3A-4, in an embodiment, the speaker 18 is located between the power source 16 and the temple arm proximal end 12A. A compartment 30 is located between, and is at least partially defined by, the power source 16 and the speaker 18. In another embodiment, the compartment 30 may be defined by the material of the temple arm 12 and the speaker 18, but not by the power source 16. The compartment 30 is in fluid (e.g., air) communication with an audio channel 32.

The audio channel 32 is located through at least a portion of the temple arm 12. One or more audio ports 34 are located in the temple arm 12 and are in acoustic communication with the speaker 18 via the audio channel 32. Acoustic waves are operable to propagate through the air in the audio channel 32. In an embodiment, the audio ports 34 are located generally forward of the wearer's auricle 50 (the outer ear) and above the wearer's ear canal 52, while the speaker 18 is located generally behind, or rearward of, the wearer's auricle 50. In an embodiment, the audio channel 32 includes a generally rectangular passageway 36 in acoustic communication with the speaker 18. The compartment 30 forms a sealed back volume. In other embodiments, the passageway 36 may comprise cross-sectional geometries such as, but not limited to, circular, elliptical, and triangular. The passageway 36 is also in acoustic communication with the audio ports 34. The one or more audio ports 34 are located generally in the bottom of the temple arm 12. In an embodiment, to reduce destructive interference of the sound waves propagated through the audio channel 32 to the audio ports 34, the passageway 36 includes an angled surface 38 oriented to deflect the sound waves toward the audio ports 34. The angled surface 38 deflects sound waves propagating in a generally horizontal direction in a generally vertical direction toward the one or more audio ports 34. Sound waves 54 exit the one or more audio ports 34 and are incident upon the wearer's ear canal 52. In an embodiment, the speaker 18 is positioned such that the audio driver is operable to oscillate in a direction generally perpendicular to the passageway 36.

By locating the speaker 18 in the distal end 12B of the of temple arm 12 remote from the wearer's ear canal, the compartment 30 can have a size operable to form a back volume around the speaker 18, without creating discomfort for the wearer due to the size of the temple arm 12. The audio channel 32 is operable to transmit sound waves from the speaker 18 along at least a portion of the length of the temple arm 12 to the audio ports 34. In other words, the audio channel 32 enables the audio ports 34 to be located at any position along the temple arm 12, independent of the speaker 18 location.

In an embodiment, the interface between a front volume and the passageway 36 defines an aperture 40. The aperture 40 has a first width $w_1$ and the passageway 36 has a second width $w2$, wherein the second width $w2$ is greater than the first width $w_1$. In an embodiment, the passageway 36 gradually increases in width from the smallest width of the aperture 40. In an embodiment, the compartment 30 gradually increases in width from the smallest width of the aperture 40.

Figure 5:
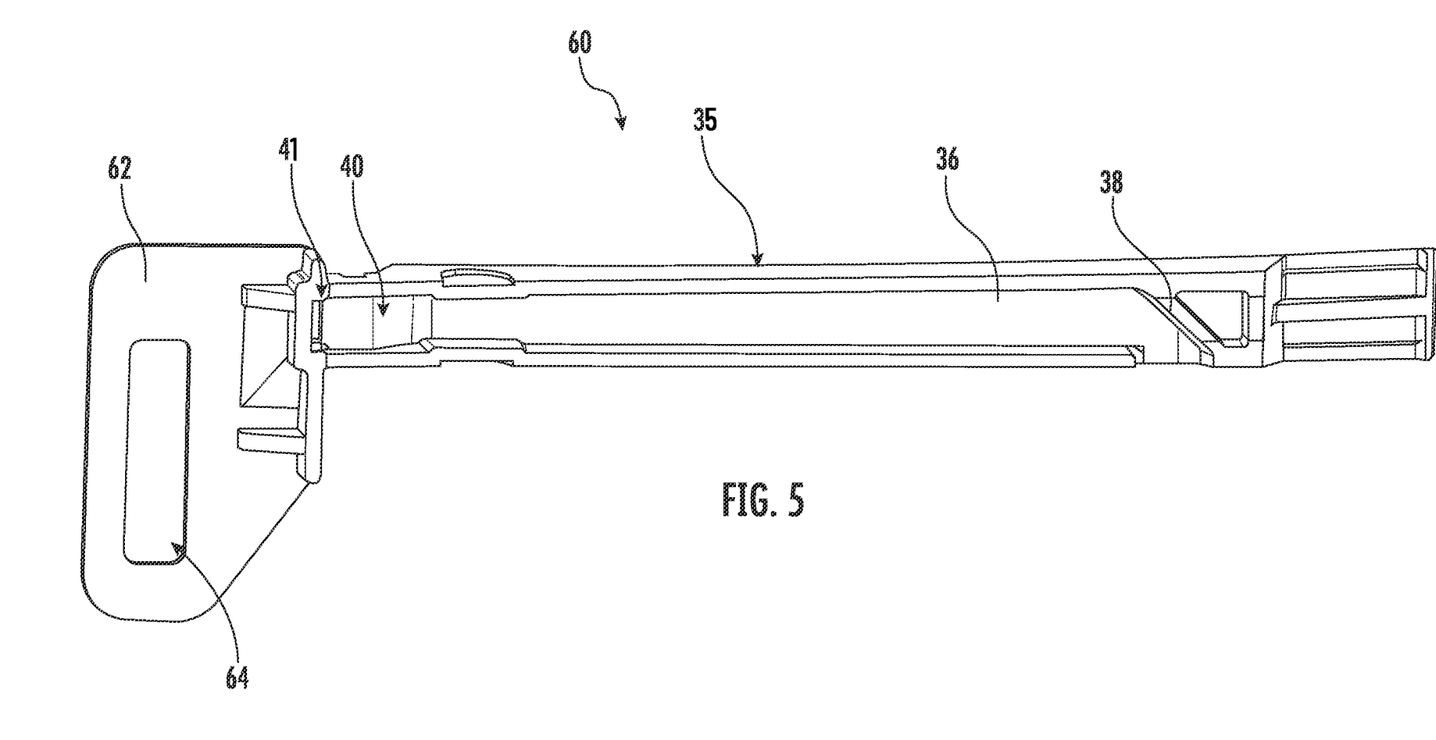
FIG. 5 shows a right side perspective view of a portion of the smart glasses device audio channel according to FIG. 2.
Figure 6:
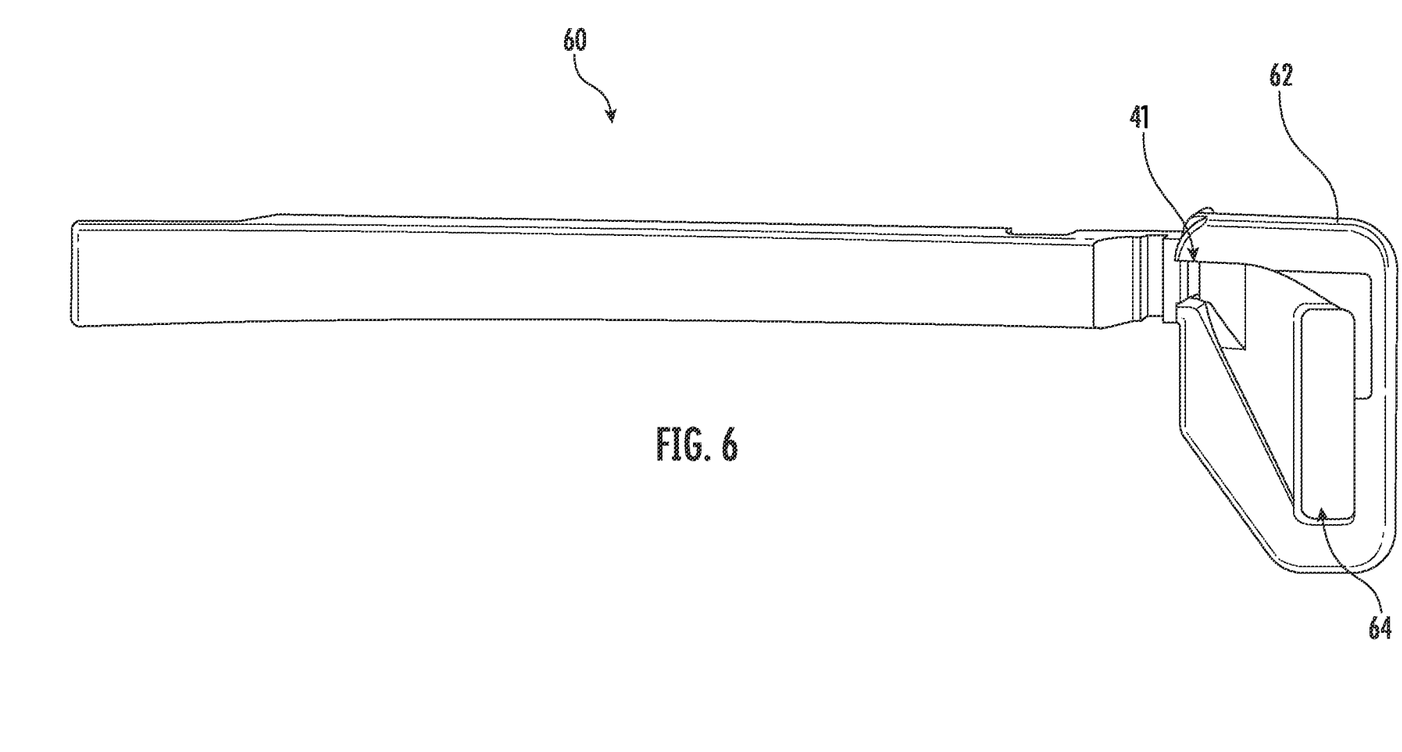
FIG. 6 shows a left side perspective view of a portion of the smart glasses device audio channel according to FIG. 2.
Figure 7:
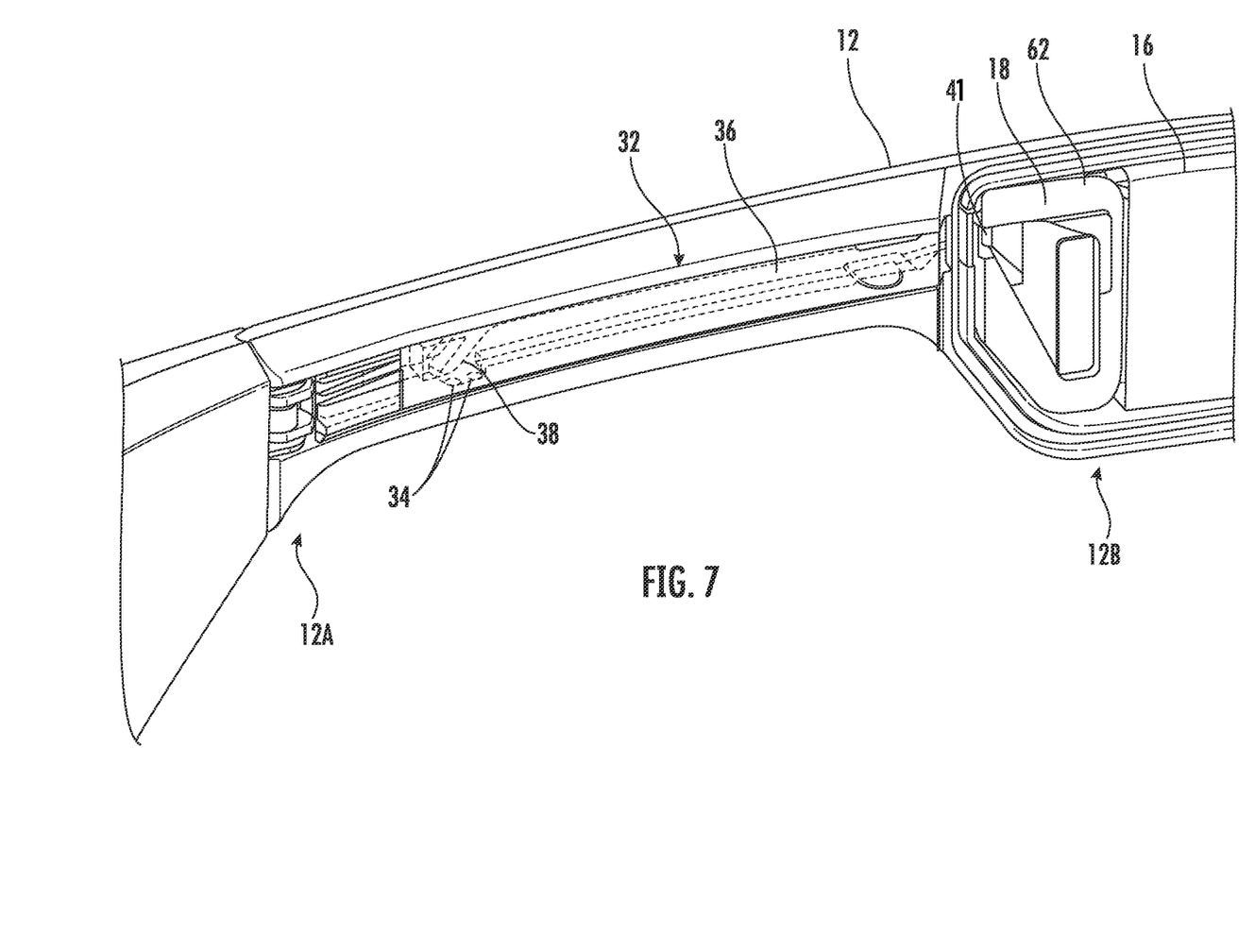
FIG. 7 shows a left side perspective view of the portion of the smart glasses device according to FIG. 2.
Figure 8:
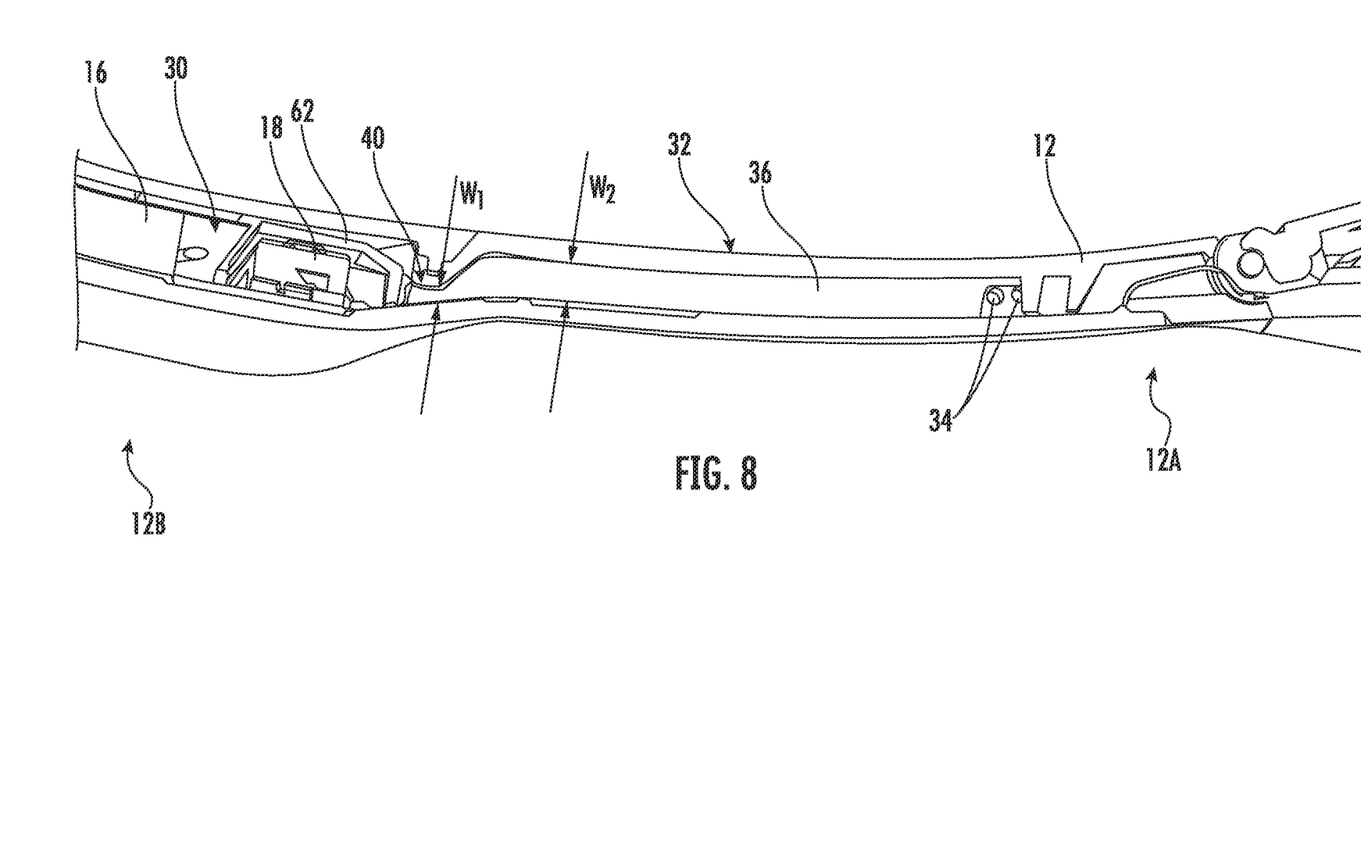
FIG. 8 shows a top cross-sectional perspective view of a portion of the smart glasses device according to FIG. 2.
Figure 9:
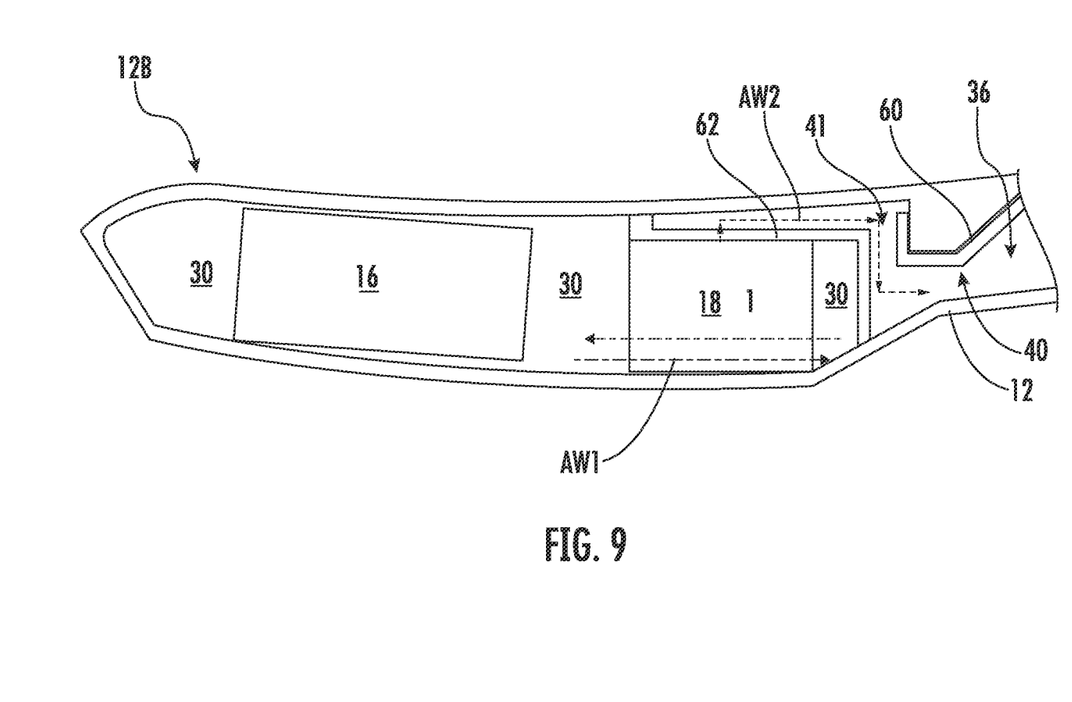
FIG. 9 shows a top cross-sectional view of a portion of the smart glasses device according to FIG. 2.

Referring now to FIGS. 5, 6 and 8, in an embodiment, the temple arm 12 includes an acoustic guide 60. The acoustic guide 60 defines at least a portion of the audio channel passageway 36. In an embodiment, the acoustic guide includes a channel arm 35 connected with a speaker plate 62. In one embodiment, the acoustic guide channel arm 35 forms three surfaces of the rectangular passageway 36 and the outward facing portion of the temple arm 12 forms the fourth surface of the rectangular passageway 36. The acoustic guide speaker plate 62 is located in the compartment 30 and abutting, or coupled with, the speaker 18. The speaker plate 62 and an inward facing portion of the temple arm 12 at least partly define the front volume. The speaker plate 62 includes an aperture 64 through which the driver of the speaker 18 is in acoustic communication with the front volume. The acoustic guide 60 defines an aperture 41 between the speaker plate 62 and the channel arm 35. The aperture 41 provides fluid communication between the front volume and the aperture 40 and/or the passageway 36. As shown in FIG. 9, in an embodiment, acoustic waves AW1 generated by the speaker 18 propagate through the front volume, and through the apertures 41, 40 into the passageway 36.

In an embodiment, an acoustic material operable to filter acoustic waves of a predetermined pressure is located at, or adjacent to, the aperture 40. In an embodiment, an acoustically transparent material through which acoustic waves travel without substantial effect is located at, or adjacent to, the one or more audio ports 34 to prevent dust, dirt, liquids and similar debris from entering the passageway 36.

Figure 2:
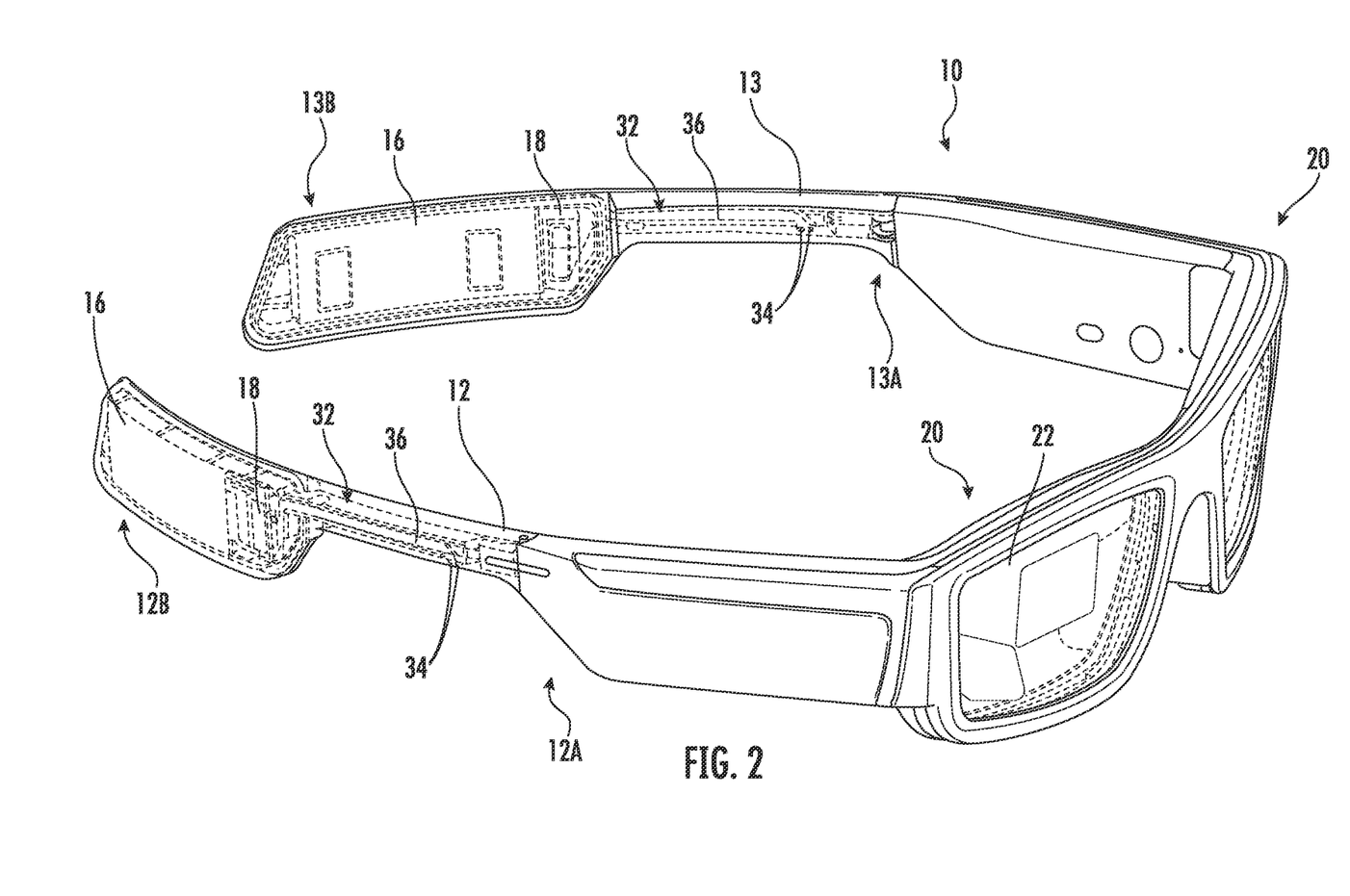
FIG. 2 shows a perspective view of a smart glasses device according to an embodiment of the present disclosure.

In an embodiment, as illustrated in FIG. 2, the smart glasses 10 may also include a left temple arm 13 having a proximal end 13A and a distal end 13B, the temple arm 13 including a second speaker 18 and audio channel 32 as described with regard to the right temple arm 12. Having a speaker 18 and audio channel 32 in each temple arm 12, 13 enables stereophonic sound.

One or more features of the embodiments described herein may be combined to create additional embodiments which are not depicted. While various embodiments have been described in detail above, it should be understood that they have been presented by way of example, and not limitation. It will be apparent to persons skilled in the relevant arts that the disclosed subject matter may be embodied in other specific forms, variations, and modifications without departing from the scope, spirit, or essential characteristics thereof. The embodiments described above are therefore to be considered in all respects as illustrative, and not restrictive. The scope of the invention is indicated by the appended claims, and all changes that come within the meaning and range of equivalents thereof are intended to be embraced therein.

What is claimed is:

1. A smart glasses device, comprising:
   a temple arm having a proximal end and a distal end;
   an optical system coupled with said temple arm proximal end;
   a speaker located at least partially in said temple arm distal end;
   a compartment located at least partially about said speaker, wherein said compartment forms a back volume;
   a passageway located at least partially within said temple arm, wherein said passageway is in acoustic communication with said speaker; and
   one or more audio ports located in said temple arm, wherein said one or more audio ports are in acoustic communication with said passageway.

2. The smart glasses device according to claim 1, wherein said one or more audio ports are configured to be located above a wearer's ear canal forward of said wearer's auricle.

3. The smart glasses device according to claim 2, wherein said speaker is configured to be located behind said wearer's auricle.

4. The smart glasses device according to claim 1, wherein said passageway comprises an angled surface located at least partially above said one or more audio ports, wherein said surface is operable to deflect acoustic waves toward said one or more audio ports.

5. The smart glasses device according to claim 1, further comprising a power source located at least partially in said temple arm distal end, wherein said power source is at least partially located in said compartment.

6. The smart glasses device according to claim 1, further comprising a front volume, and an aperture located between said front volume and said passageway, wherein said front volume has a first width, said passageway has a second width, and said aperture has a third width, wherein said third width is less than said second width.

7. The smart glasses device according to claim 1, wherein said optical system comprises a planar waveguide assembly operable to in-couple image-bearing light, propagate said image-bearing light via total internal reflection, and out-couple said image-bearing light to produce a virtual image within an eyebox.

8. The smart glasses device according to claim 1, wherein said speaker comprises a driver operable to oscillate in a direction perpendicular to at least a portion of said passageway.

9. The smart glasses device according to claim 1, wherein said one or more audio ports are located adjacent to said temple arm proximal end.

10. The smart glasses device according to claim 1, wherein said one or more audio ports are located in a bottom surface of said temple arm.

11. The smart glasses device according to claim 1, further comprising:
    a second temple arm having a proximal end and a distal end;
    a second speaker located at least partially in said second temple arm distal end;
    a second compartment located at least partially about said second speaker, wherein said second compartment forms a second back volume;
    a second passageway located at least partially within said second temple arm, wherein said second passageway is in acoustic communication with said second speaker; and
    a second audio port located in said second temple arm, wherein said second audio port is in acoustic communication with said second passageway.

12. The smart glasses device according to claim 1, wherein said passageway is at least partially defined by an acoustic guide having a speaker plate at least partly defining a front volume.

13. The smart glasses device according to claim 1, wherein said compartment is at least partially defined by said temple arm.

14. A smart glasses device, comprising:
    a temple arm having a proximal end and a distal end;
    an optical system coupled with said temple arm proximal end;
    a speaker located at least partially in said temple arm distal end;
    a compartment located at least partially about said speaker, wherein said compartment forms a back volume;
    a passageway located at least partially within said temple arm, wherein said passageway is in acoustic communication with said speaker;
    one or more audio ports located in said temple arm, wherein said one or more audio ports are in acoustic communication with said passageway;

a front volume; and an aperture located between said front volume and said passageway, wherein said front volume has a first width, said passageway has a second width, and said aperture has a third width, wherein said third width is less than said second width.

15. The smart glasses device according to claim 14, wherein said compartment is at least partially defined by said temple arm.

* * * * *